(12) United States Patent
Anderson et al.

(10) Patent No.: US 8,551,382 B2
(45) Date of Patent: Oct. 8, 2013

(54) MODIFIED BLADE STIFFENER AND FABRICATION METHOD THEREFOR

(75) Inventors: Michael R. Anderson, Renton, WA (US); Darrell D. Jones, Mill Creek, WA (US); Carla D. Murray, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1530 days.

(21) Appl. No.: 12/128,173

(22) Filed: May 28, 2008

(65) Prior Publication Data

US 2009/0297358 A1 Dec. 3, 2009

(51) Int. Cl.
*B29C 43/20* (2006.01)
(52) U.S. Cl.
USPC ........... 264/259; 264/334; 264/257; 264/258; 264/318; 264/320
(58) Field of Classification Search
USPC ................. 264/334, 257, 258, 259, 318, 320; 425/577, 466
See application file for complete search history.

(56) References Cited

U.S. PATENT DOCUMENTS

| 5,211,901 | A * | 5/1993 | Fray ............................. 264/258 |
| 7,527,759 | B2 | 5/2009 | Lee et al. |
| 2003/0102601 | A1* | 6/2003 | Fick ............................ 264/319 |
| 2003/0168555 | A1* | 9/2003 | Livi et al. ...................... 244/132 |
| 2004/0265536 | A1* | 12/2004 | Sana et al. .................... 428/119 |
| 2006/0231981 | A1 | 10/2006 | Lee et al. |
| 2007/0039284 | A1 | 2/2007 | Munoz Royo et al. |
| 2007/0098935 | A1* | 5/2007 | Farran et al. ................. 425/577 |

FOREIGN PATENT DOCUMENTS

| EP | 1439121 A1 | 7/2004 |
| EP | 2128019 A2 | 12/2009 |
| JP | 2004352187 A | 12/2004 |
| WO | 2007134790 A1 | 11/2007 |

OTHER PUBLICATIONS

European Search Report, dated Sep. 23, 2010, regarding Application No. EP09160765 (EP2128019), 6 pages.

* cited by examiner

*Primary Examiner* — Timothy Kennedy
(74) *Attorney, Agent, or Firm* — Yee & Associates, P.C.

(57) ABSTRACT

The disclosure is generally directed to a modified blade stiffener having enhanced mechanical properties. An illustrative embodiment of the modified blade stiffener includes a stiffener-forming material shaped into a pair of coupled blades having first and second ends, a filler cavity provided at the first end of the blades, a blade filler provided in the filler cavity and a pair of blade flanges provided at the second end of the blades.

19 Claims, 5 Drawing Sheets

MODIFIED BLADE STIFFENER AND FABRICATION METHOD THEREFOR

TECHNICAL FIELD

The disclosure relates to blade stiffeners for aircraft structures. More particularly, the disclosure relates to a modified blade stiffener having enhanced mechanical properties and a method of fabricating a modified blade stiffener which can be fabricated as a single piece without the use of fasteners.

BACKGROUND

In the fabrication of some structures such as aircraft, for example, it may be desirable to use composite panels due to the panels' high strength-to-weight ratio. Stiffening elements may be attached to the composite panels at various locations to reinforce and impart structural strength to the panels. These stiffening elements may include, for example, hat stiffeners; I-beams; blade stiffeners; honeycomb cores; and foam cores.

The conventional types of stiffening elements used to stiffen composite panels may have various disadvantages. For example, hat stiffeners may occupy a relatively large area on the panel and may require internal support for cure. I-beams may need to be fabricated from multiple pieces and may require complex tooling during cure to maintain their profile. Furthermore, the tooling may be difficult to remove after cure. Traditional blade stiffeners may not be as structurally efficient as other shapes. Honeycomb and foam core may be heavier and may have a tendency to be crushed during cure and to retain water in service.

What is needed is a modified blade stiffener having enhanced mechanical properties and a method of fabricating a modified blade stiffener which can be fabricated as a single piece without the use of fasteners.

SUMMARY

The disclosure is generally directed to a modified blade stiffener having additional reinforcement at the top of the blade to increase the mechanical performance. An illustrative embodiment of the modified blade stiffener includes a stiffener-forming material shaped into a pair of coupled blades having first and second ends, a filler cavity provided at the first end of the blades, a blade filler provided in the filler cavity and a pair of blade flanges provided at the second end of the blades.

The disclosure is further generally directed to a method of forming a modified blade stiffener. An illustrative embodiment of the method includes providing a blade-forming assembly having a pair of tool dies, a tool gap between the tool dies and a forming cavity in each tool die; providing a layup charge of stiffener-forming material; bridging the tool gap between the tool dies with the layup charge; placing a blade filler on the layup charge at the tool gap; pressing the blade filler through the tool gap between the tool dies until the blade filler reaches and extends into the forming cavities in the tool dies; and pressing the tool dies together to substantially eliminate the tool gap.

DETAILED DESCRIPTION

Figure 1:
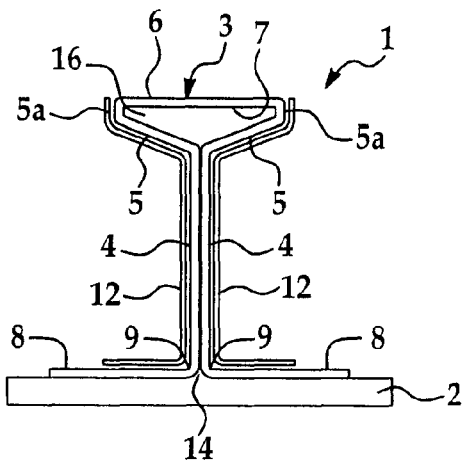
FIG. 1 is a cross-sectional view of a modified blade stiffener attached to a composite panel, with cure tools engaging the modified blade stiffener.
Figure 8:
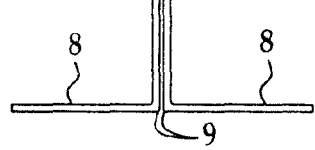
FIG. 8 is a cross-sectional view of a modified blade stiffener fabricated according to the method shown in FIGS. 2-7.
Figure 9:
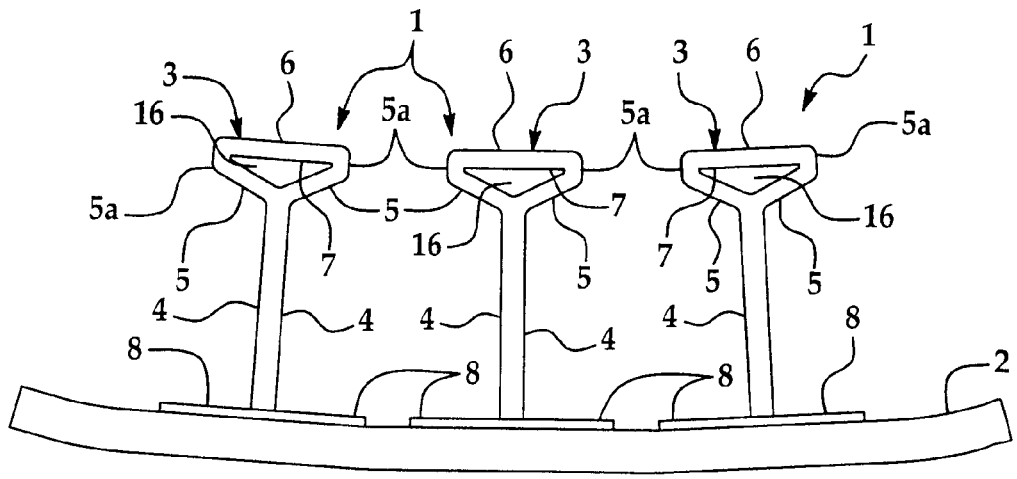
FIG. 9 is a cross-sectional view of a composite panel, with multiple modified blade stiffeners attached to the composite panel.

Referring initially to FIGS. 1, 8 and 9, an illustrative embodiment of the modified blade stiffener is generally indicated by reference numeral 1. The modified blade stiffener 1 may include a formed sheet of stiffener-forming material 3 which may include a pair of generally elongated, adjacent, parallel blades 4. The stiffener-forming material may be composite plies, prepreg material or resin-infused dry fabric preform, for example and without limitation. A pair of blade flanges 8 may extend outwardly from the respective blades 4 at a pair of respective blade/flange junctions 9. The plane of each blade flange 8 may be disposed in generally perpendicular relationship with respect to the plane of the corresponding blade 4 from which the blade flange 8 extends.

A pair of blade arms 5 may extend from the respective blades 4 opposite the blade flanges 8. The plane of each blade arm 5 may be oriented at an obtuse angle or radius of curvature with respect to the plane of the corresponding blade 4 from which the blade arm 5 extends. A pair of straight or curved arm portions 5a may extend from the respective blade arms 5. A blade arm connecting portion 6 may extend between the straight or curved arm portions 5a of the blade arms 5. The blade arms 5, straight or curved arm portions 5a and blade arm connection portion 6 may together define a filter cavity 7 which in fabrication of the modified blade stiffener 1 may contain a blade filler 16 which may be an uncured, partially cured, or fully cured formed composite, for example. The blade filler 16 may be used to form the shape of the blade arms 5, the straight or curved arm portions 5a and the blade arm connecting portion 6 during fabrication of the modified blade stiffener 1, as will be hereinafter described. As shown in FIG. 1, a flange filler 14, which may be an uncured formed composite, for example, may be provided between the blades 4 at each blade/flange junction 9.

As shown in FIG. 9 and will be hereinafter described, in typical application the blade flanges 8 of a series of multiple modified blade stiffeners 1 may be attached to a composite panel 2 to stiffen and reinforce the composite panel 2. The composite panel 2 may form a part of an aircraft structure (not shown) or other structure. In FIG. 1, a pair of cure tools 12 is shown engaging the respective sides of the modified blade stiffener 1.

Figure 2:
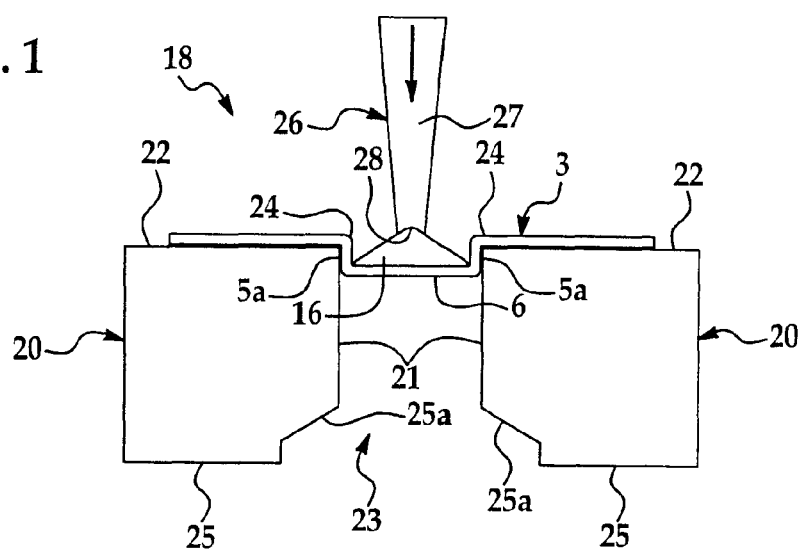
FIGS. 2-7 are cross-sectional views which illustrate sequential fabrication of a modified blade stiffener according to a method of fabricating a modified blade stiffener.
Figure 3:
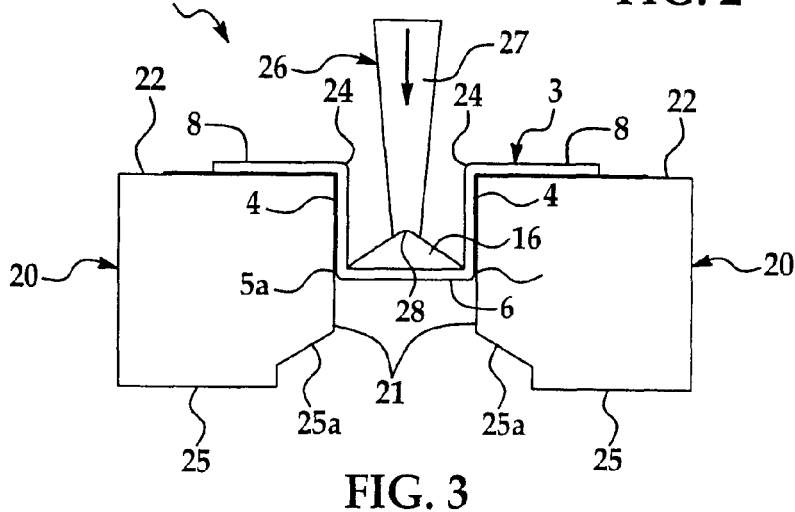

Referring next to FIGS. 2-7, sequential steps of an illustrative method of fabricating the modified blade stiffener 1 using a blade-forming assembly 18 is shown. In FIG. 2, a pair of tool dies 20 of the blade-forming assembly 18 is initially positioned in spaced-apart relationship with respect to each other. The tool dies 20 may include a pair of respective initially spaced-apart and facing blade shaping surfaces 21 and a pair of blade flange shaping surfaces 22 which may extend in generally perpendicular relationship with respect to the respective blade shaping surfaces 21. Each tool die 20 may also have a tool die base 25. A forming cavity 25a may extend into the blade shaping surface 21 and tool die base 25 of each tool die 20. The forming cavities 25a may have a shape which is generally complementary to that of the blade filler 16. A surface junction 24 may be defined between each blade shaping surface 21 and the corresponding blade flange shaping surface 22. The blade shaping surfaces 21 of the respective tool dies 20 may face each other on opposite sides of a tool gap 23 between the tool dies 20.

As further shown in FIG. 2, a layup charge of the sheet of stiffener-forming material 3 may be initially placed on the blade flange shaping surfaces 22 of the respective tool dies 20 and extends or bridges over the tool gap 23. A forming bar 26 may include a generally elongated forming bar shaft 27 having a generally V-shaped filler notch 28 in one end thereof. A blade filler 16 may be placed on the segment of the composite plies sheet 3 which spans or bridges the tool gap 23 between the tool dies 20. The filler notch 28 of the forming bar 26 may engage and apply force against the blade filler 16 along the longitudinal axis of the forming bar shaft 27. Accordingly, the blade filler 16 deforms the portion of the composite plies sheet 3 which spans the tool gap 23 as that portion of the composite plies sheet 3 may be pushed into the tool gap 23 and between the blade shaping surfaces 21 of the respective tool dies 20. That portion of the composite plies sheet 3 which may be pushed into the tool gap 23 may eventually form the blade arm connecting portion 6 of the modified blade stiffener 1. The portions of the composite plies sheet 3 which engage the respective blade shaping surfaces 21 at the point in the fabrication process shown in FIG. 2 may eventually form the respective straight or curved arm portions 5a in the modified blade stiffener 1.

Figure 4:
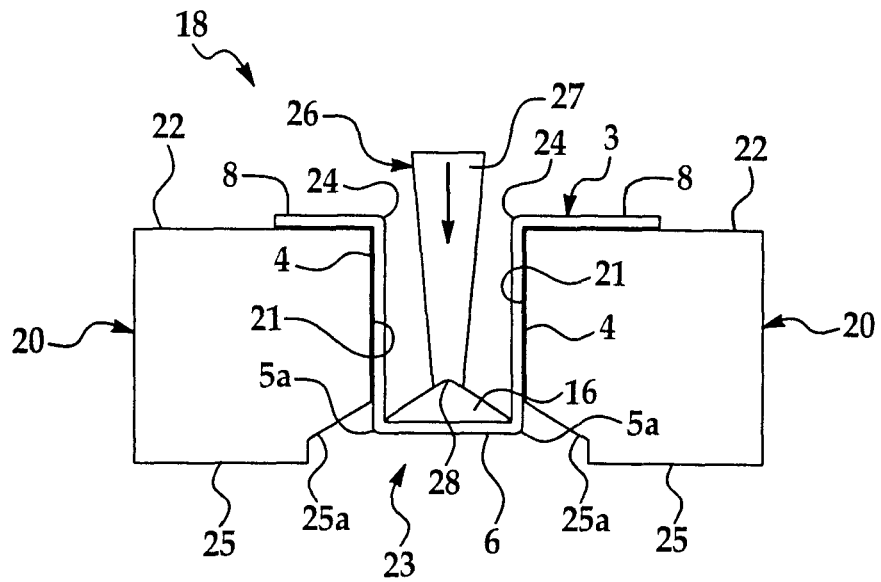
Figure 5:
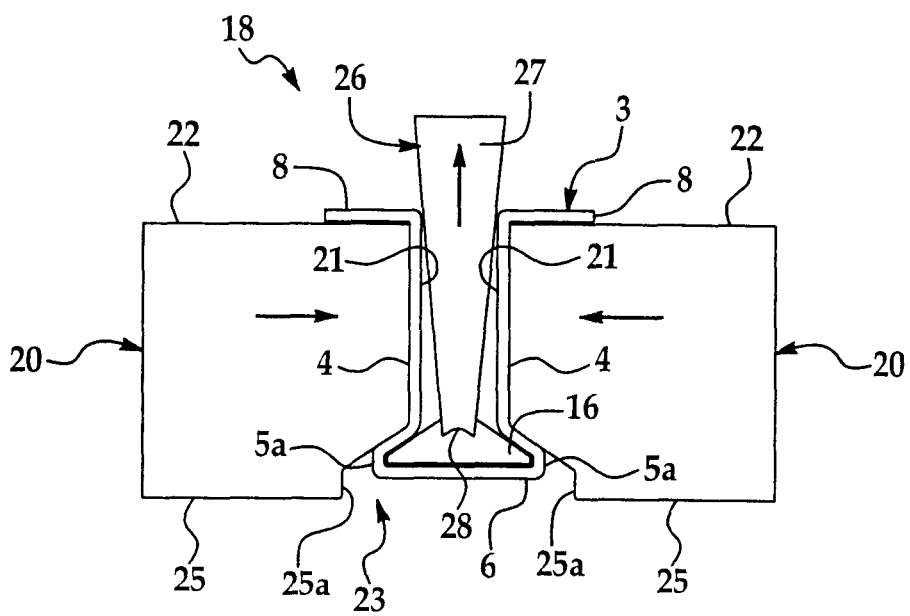
Figure 6:
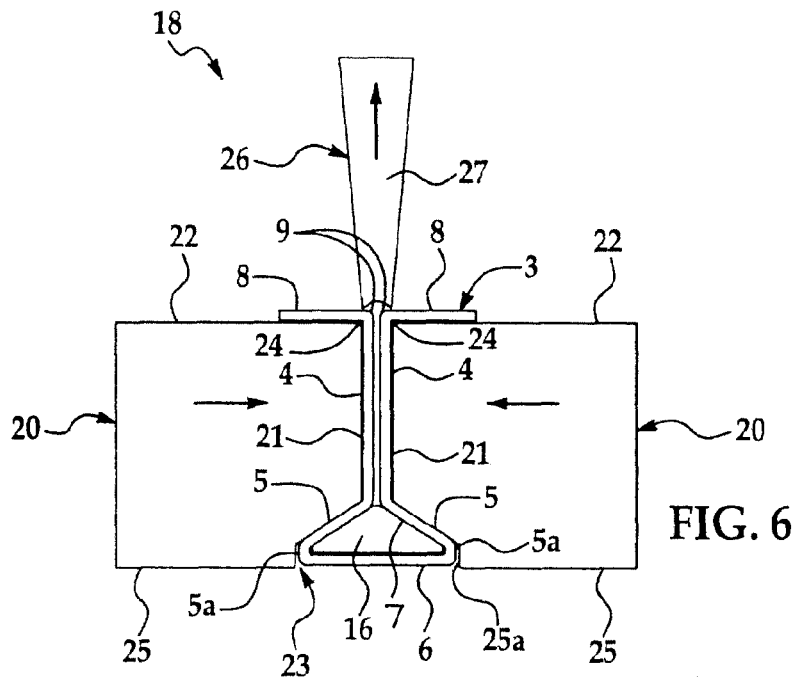

As shown in FIGS. 3-6, the forming bar 26 may continue to push the composite plies sheet 3 through the tool gap 23 between the tool dies 20 to form the blades 4 of the modified blade stiffener 1 until the blade arm connecting portion 6 reaches the base 25 of each tool die 20, as shown in FIG. 6. During extension of the composite plies sheet 3 through the tool gap 23, the blade shaping surfaces 21 of the respective tool dies 20 may engage and shape the respective blades 4, whereas the blade flange shaping surfaces 22 of the respective tool dies 20 may engage and shape the respective blade flanges 8. Extension of the composite plies sheet 3 into the tool gap 23 may continue until the entire portion of the composite plies sheet 3 which will become a blade 4 of the modified blade stiffener 1 engages and extends along the blade forming surface 21 of the corresponding tool die 20, as shown in FIG. 6. At that point, each blade/flange junction 9 of the modified blade stiffener 1 may be located at the surface junction 24 of each corresponding tool die 20.

Figure 7:
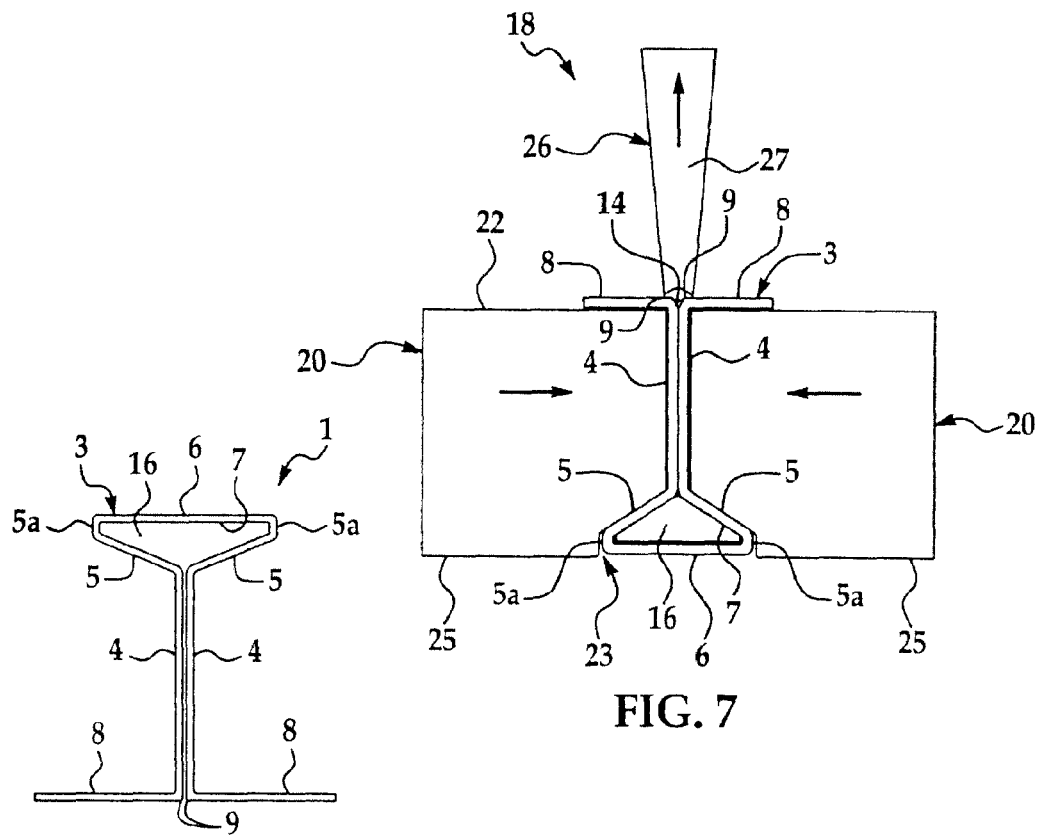

As shown in FIGS. 4 and 5, as the forming bar 26 pushes the composite plies sheet 3 through the tool gap 23 toward the tool die bases 25, the tool dies 20 may be gradually moved toward each other. The forming bar 26 may then be disengaged from the blade filler 16 and removed from the tool gap 23, as shown in FIG. 5. Eventually, the blade shaping surfaces 21 of the respective tool dies 20 may press the blades 4 of the modified blade stiffener 1 against each other, as shown in FIG. 7. As shown in FIGS. 5 and 6, during movement of the tool dies 20 toward each other, the forming cavities 25a of the respective tool die 20 receive the complementary-shaped blade filler 16. Therefore, the composite plies sheet 3 may be pressed between the blade filler 16 and the interior surfaces of the forming cavities 25a, thus forming the composite plies sheet 3 into the blade arms 5 and the straight arm portions 5a of the modified blade stiffener 1. As shown in FIG. 6, the blade filler 16 may remain in the filler cavity 7 which may be defined by the blade arms 5, the straight or curved arm portions 5a and the blade arm connecting portion 6. As shown in FIG. 7, the flange filler 14 may be provided between the blades 4 at each blade/flange junction 9. The flange filler 14 and the blade filler 16 may be located at the farthest points from the center of the modified blade stiffener 1 to maximize the stiffness and structural efficiency of the modified blade stiffener 1. Finally, the tool dies 20 may be disengaged from the modified blade stiffener 1. It will be appreciated by those skilled in the art that the modified blade stiffener 1 may be fabricated as a single piece with no fasteners or secondary bonding.

Referring next to FIGS. 1 and 9, in typical application multiple modified blade stiffeners 1 may be bonded or co-cured to the composite panel 2 in a selected pattern, spacing and density to customize local stiffness of the composite panel 2. Accordingly, the blade flanges 8 of each modified blade stiffener 1 may be attached to the surface of the composite panel 2 according to the knowledge of those skilled in the art. As shown in FIG. 1, cure tools 12 may be placed in proximity to respective sides of the modified blade stiffener 1 for curing of the composite plies sheet 3.

It will be appreciated by those skilled in the art that the shape of the modified blade stiffener 1 allows the use of cure tools 12 (FIG. 1) that automatically center on the modified blade stiffener 1 and can be quickly and easily removed after cure without the use of special equipment. Due to its small footprint on the composite panel 2 and the compact nature of the cure tool 12 (FIG. 1), the modified blade stiffeners 1 can be placed more closely together on the composite panel 2 than is the case with typical hat-shaped stiffeners to allow specific tailoring of the performance of the overall structure. The compact or low-profile nature of the modified blade stiffener 1 may also allow it to be used in combination with other types of stiffeners such as hat-type stiffeners (not shown) to augment panel stiffness locally where there may be insufficient space to add additional hat-type stiffeners. Furthermore, the modified blade stiffener 1 may not require internal tooling such as the bladders which may be necessary for the fabrication of hat-type stiffeners; therefore, there may be no treatments or tools that must be prepared before use or extracted from the modified blade stiffener 1 after cure. The modified blade stiffeners 1 may be more structurally efficient than standard blade stiffeners and may be located more densely than hat-type stiffeners and may be easier to customize for structural requirements. The blade forming assembly 18 may fabricate finished modified blade stiffeners 1 that can be installed directly on the composite panel 2 without the need for additional assembly steps. In some applications, the bulbous end of the modified blade stiffener 1, defined by the blade arms 5; the straight or curved arm portions 5a; and the blade arm connecting portion 6, may be inserted in a receiving slot (not shown) provided in a frame (not shown) to reduce or eliminate the number of fasteners needed to couple a stringer (not shown) to the frame.

Figure 10:
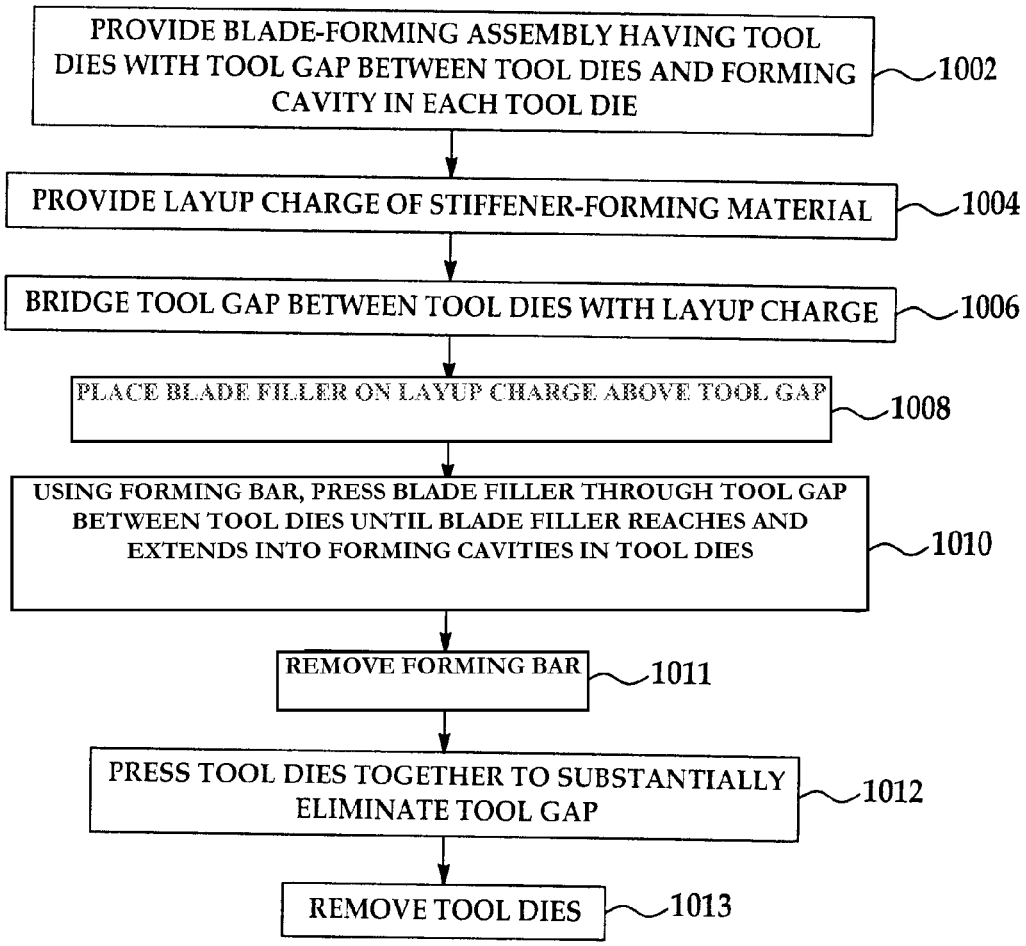
FIG. 10 is a flow diagram which illustrates an illustrative method of fabricating a modified blade stiffener.

Referring next to FIG. 10, a flow diagram 1000 which illustrates an illustrative method of fabricating a modified blade stiffener is shown. In block 1002, a blade-forming assembly having tool dies with a tool gap between the tool dies and a forming cavity in each tool die may be provided. In block 1004, a layup charge of a stiffener-forming material may be provided. In block 1006, the tool gap between the tool dies may be bridged with the layup charge. In block 1008, a blade filler may be placed on the layup charge above the tool gap. In block 1010, the blade filler may be pressed, using a forming bar, through the tool gap between the tool dies until the blade filler reaches and extends into the forming cavities in the tool dies. The forming bar is then removed in block 1011. In block 1012, the tool dies may be pressed together to substantially eliminate the tool gap. In the final block 1013, the tool dies are removed.

Figure 11:
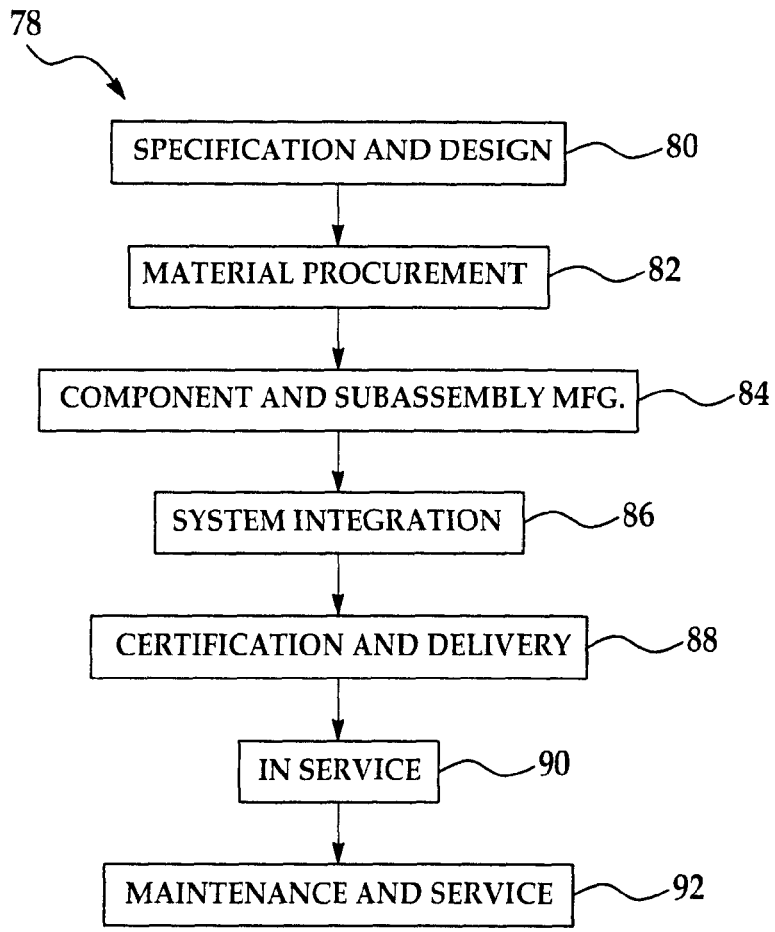
FIG. 11 is a flow diagram of an aircraft production and service methodology.
Figure 12:
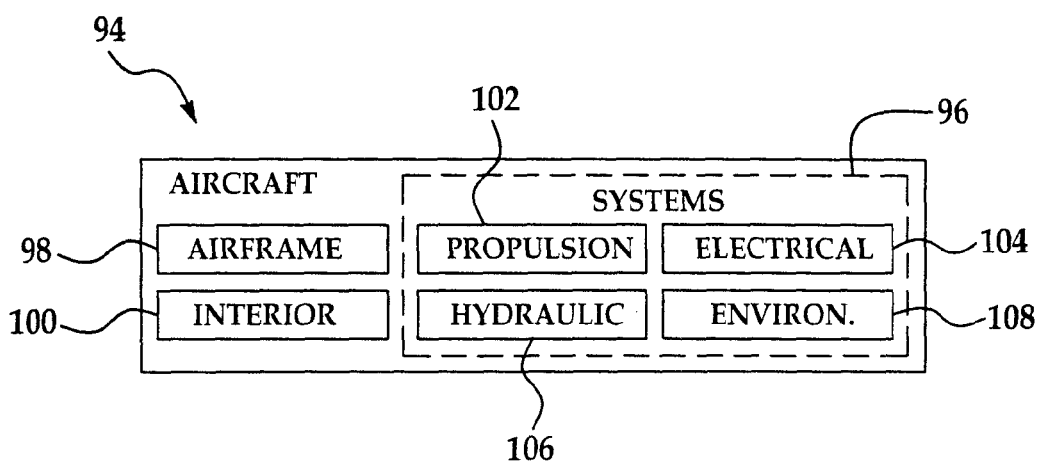
FIG. 12 is a block diagram of an aircraft.

Referring next to FIGS. 11 and 12, embodiments of the disclosure may be used in the context of an aircraft manufacturing and service method 78 as shown in FIG. 11 and an aircraft 94 as shown in FIG. 12. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of forming a blade stiffener, comprising:
   using a layup charge of stiffener-forming material and a blade-forming assembly having a first tool die, a second tool die, a tool gap between the first tool die and the second tool die, a first forming cavity in the first tool die, and a second forming cavity in the second tool die, wherein using comprises bridging the tool gap with the layup charge to form a blade arm connecting portion;
   placing a blade filler on the blade arm connecting portion at the tool gap;
   pressing, using a forming bar, said blade filler through the tool gap between the first tool die and the second tool die until the blade filler reaches and extends into the first forming cavity and the second forming cavity;
   removing the forming bar; and
   pressing said tool dies together such that a first side of the layup charge contacts the first forming cavity in the first tool die and the second forming cavity in the second tool die, and an opposite side of the layup charge contacts the blade filler, and the blade arm connecting portion extends between the first tool die and the second tool die, with the tool gap being substantially eliminated.

2. The method of claim 1 wherein said layup charge of stiffener-forming material comprises at least one of: sheets of composite plies, prepreg material, and resin-infused dry fabric preform.

3. The method of claim 1 wherein said placing the blade filler on the blade arm connecting portion comprises placing the blade filler comprising an uncured formed composite on said layup charge.

4. The method of claim 1 wherein using the blade-forming assembly further comprises having the first tool die having a first blade flange shaping surface, a first blade shaping surface generally perpendicular to said first blade flange shaping surface and a first tool die base generally perpendicular to said first blade shaping surface, and the second tool die having a second blade flange shaping surface, a second blade shaping surface generally perpendicular to said second blade flange shaping surface and a second tool die base generally perpendicular to said second blade shaping surface.

5. A method of forming a blade stiffener for aircraft structure, comprising:
   using a layup charge of stiffener-forming material and a blade-forming assembly having a first tool die, a second tool die, a tool gap between the first tool die and the second tool die, a first forming cavity in the first tool die, and a second forming cavity in the second tool die, wherein using comprises bridging the tool gap with the layup charge to form a blade arm connecting portion;
   placing a blade filler on the blade arm connecting portion the tool gap;
   forming a first blade, a second blade, a first blade flange, a second blade flange, a first blade arm, a second blade arm, and a filler cavity of the blade stiffener by pressing the blade filler through the tool gap between the first tool die and the second tool die until the blade filler reaches and extends into the first forming cavity and the second forming cavity, with the first blade and the first blade arm, being connected to the first blade, engaging the first tool die, and the second blade and second blade arm, being connected to the second blade, engaging the second tool die such that a first side of the layup charge contacts the first forming cavity and the second forming cavity, and an opposite side of said layup charge contacts the blade filler, and the blade arm connecting portion extends between the first tool die and the second tool die;
   leaving the blade filler in the filler cavity;
   pressing the first tool die and the second tool die together to substantially eliminate the tool gap; and
   providing a flange filler between the first blade and the second blade.

6. The method of claim 1, wherein pressing the blade filler through the tool gap further comprises creating a filler cavity defined by a first blade arm and a second blade arm both being connected to the blade arm connecting portion.

7. The method of claim 1, further comprising fabricating the blade stiffener as a single piece with no fasteners or secondary bonding.

8. The method of claim 1, further comprising:
   engaging the blade stiffener with a first curing tool and a second curing tool.

9. The method of claim 8, further comprising:
curing the blade stiffener.

10. The method of claim 9, further comprising:
at least one of: co-curing, and bonding, the blade stiffener to a composite structure.

11. The method of claim 5, wherein said layup charge of stiffener-forming material comprises at least one of: sheets of composite plies, prepreg material, and resin-infused dry fabric preform.

12. The method of claim 5, wherein forming the first blade, the second blade, the first blade flange, and the second blade flange, further comprises having a first blade flange shaping surface, a first blade shaping surface generally perpendicular to the first blade flange shaping surface, and a first tool die base generally perpendicular to the first blade shaping surface, and having a second blade flange shaping surface, a second blade shaping surface generally perpendicular to the second blade flange shaping surface, and a second tool die base generally perpendicular to the second blade shaping surface.

13. The method of claim 5, the filler cavity defined by the first blade arm, the second blade arm, and the blade arm connecting portion.

14. The method of claim 5, further comprising fabricating the blade stiffener as a single piece with no fasteners or secondary bonding.

15. The method of claim 5, further comprising:
engaging the blade stiffener with a pair of curing tools.

16. The method of claim 15, further comprising:
curing the blade stiffener.

17. The method of claim 16, further comprising:
at least one of: co-curing, and bonding, said blade stiffener to a composite structure.

18. A method of forming a blade stiffener for aircraft structure, comprising:
using a layup charge of stiffener-forming material and a blade-forming assembly having a first tool die, a second tool die, a tool gap between the first tool die and the second tool die, a first forming cavity in the first tool die, and a second forming cavity in the second tool die, wherein using comprises bridging the tool gap with the layup charge to form a blade arm connecting portion;
placing a blade filler on the blade arm connecting portion at the tool gap;
forming a first blade, a second blade, a first blade flange, a second blade flange, and a filler cavity of the blade stiffener by pressing the blade filler through the tool gap between the first tool die and the second tool die until the blade filler reaches and extends into the first forming cavity and the second forming cavity, with the blade and the first blade flange each engaging the first tool die, and the second blade and the second blade flange each engaging the second tool die such that a first side of the layup charge contacts the first forming cavity and the second forming cavity, and an opposite side of the layup charge contacts the blade filler, and the blade arm connecting portion extends between the first tool die and the second tool die;
leaving the blade filler in the filler cavity;
pressing the first tool die and the second tool die together to substantially eliminate the tool gap;
providing a flange filler between the first blade flange and the second blade flange;
engaging the first blade and the second blade with a curing tool;
curing the first blade and the second blade; and
at least one of: co-curing, and bonding, at least one of: the first blade flange and the second blade flange to a composite structure.

19. The method of claim 18, wherein forming the first blade, the second blade, the first blade flange, and the second blade flange, further comprises having a first blade flange shaping surface, a first blade shaping surface generally perpendicular to the first blade flange shaping surface, and a first tool die base generally perpendicular to the first blade shaping surface, and having a second blade flange shaping surface, a second blade shaping surface generally perpendicular to the second blade flange shaping surface, and a second tool die base generally perpendicular to the second blade shaping surface.

* * * * *